(12) United States Patent
Kurokawa et al.

(10) Patent No.: US 8,624,875 B2
(45) Date of Patent: Jan. 7, 2014

(54) METHOD FOR DRIVING TOUCH PANEL

(75) Inventors: Yoshiyuki Kurokawa, Kanagawa (JP); Takayuki Ikeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 572 days.

(21) Appl. No.: 12/848,251

(22) Filed: Aug. 2, 2010

(65) Prior Publication Data

US 2011/0043488 A1    Feb. 24, 2011

(30) Foreign Application Priority Data

Aug. 24, 2009   (JP) ................. 2009-193216

(51) Int. Cl.
*G06F 3/041*   (2006.01)
*G06F 3/045*   (2006.01)

(52) U.S. Cl.
USPC ............................ 345/175; 345/173; 345/174

(58) Field of Classification Search
USPC ......... 345/173, 174, 175, 87, 88, 89, 77, 207, 345/81, 104, 179, 101, 102, 103, 90, 91, 92, 345/93, 94, 95, 96, 97, 98, 99, 100, 182, 345/183, 204, 205, 206, 211, 212; 178/18.01, 18.02, 18.03, 18.09, 20.01, 178/20.02, 20.03; 349/84, 85, 139, 148
See application file for complete search history.

(56) References Cited

U.S. PATENT DOCUMENTS

| | | | |
|---|---|---|---|
| 6,597,348 B1 | 7/2003 | Yamazaki et al. | |
| 6,638,781 B1 | 10/2003 | Hirakata et al. | |
| 6,692,984 B2 | 2/2004 | Yonezawa et al. | |
| 6,724,012 B2 | 4/2004 | Kimura | |
| 6,747,290 B2 | 6/2004 | Yamazaki et al. | |
| 6,747,638 B2 | 6/2004 | Yamazaki et al. | |
| 6,972,753 B1 | 12/2005 | Kimura et al. | |
| 7,030,551 B2 | 4/2006 | Yamazaki et al. | |

(Continued)

FOREIGN PATENT DOCUMENTS

| | | |
|---|---|---|
| JP | 04-256278 | 9/1992 |
| JP | 2001-292276 | 10/2001 |
| JP | 2002-033823 | 1/2002 |
| JP | 2007/183706 | 7/2007 |

OTHER PUBLICATIONS

European Search Report (Application No. 10173140.4;EP12595) Dated Dec. 17, 2010.

*Primary Examiner* — Kent Chang
*Assistant Examiner* — Nelson Rosario
(74) *Attorney, Agent, or Firm* — Nixon Peabody LLP; Jeffrey L. Costellia

(57) ABSTRACT

A touch panel includes a plurality of pixels each of which is provided with a photo sensor including a photodiode, a first transistor, and a second transistor. Each pixel performs first operation in which a potential of a photodiode reset signal line which is electrically connected to the photodiode is set so that a forward bias is applied to the photodiode, second operation in which a potential of a gate of the first transistor is changed by a photocurrent of the photodiode, and third operation in which a potential of a gate of the second transistor is changed and the photo sensor output signal line and a photo sensor reference signal line are brought into conduction through the first transistor and the second transistor so that the potential of the photo sensor output signal line is changed in accordance with the photocurrent.

17 Claims, 12 Drawing Sheets

(56) References Cited

U.S. PATENT DOCUMENTS

| | | | |
|---|---|---|---|
| 7,068,254 B2 | 6/2006 | Yamazaki et al. | |
| 7,102,673 B2 | 9/2006 | Kimura | |
| 7,113,215 B2 | 9/2006 | Kokubun | |
| 7,224,391 B2 | 5/2007 | Kimura | |
| 7,365,750 B2 | 4/2008 | Yamazaki et al. | |
| 7,525,523 B2 | 4/2009 | Yamazaki et al. | |
| 2001/0030704 A1 | 10/2001 | Kimura | |
| 2001/0038065 A1 | 11/2001 | Kimura | |
| 2003/0020969 A1 | 1/2003 | Kimura | |
| 2008/0158461 A1* | 7/2008 | Kenmochi et al. | 349/46 |
| 2009/0033850 A1 | 2/2009 | Ishiguro et al. | |
| 2009/0101900 A1 | 4/2009 | Chuang et al. | |
| 2009/0141004 A1 | 6/2009 | Yamazaki | |
| 2009/0289910 A1* | 11/2009 | Hattori | 345/173 |
| 2009/0295769 A1 | 12/2009 | Yamazaki et al. | |
| 2010/0033450 A1 | 2/2010 | Koyama et al. | |
| 2010/0085331 A1 | 4/2010 | Kurokawa et al. | |
| 2010/0156850 A1 | 6/2010 | Kurokawa | |
| 2010/0156851 A1 | 6/2010 | Kurokawa | |
| 2010/0182282 A1 | 7/2010 | Kurokawa et al. | |
| 2010/0225615 A1 | 9/2010 | Kurokawa | |
| 2010/0328269 A1 | 12/2010 | Kurokawa | |
| 2011/0001725 A1 | 1/2011 | Kurokawa | |
| 2011/0102393 A1* | 5/2011 | Tanaka et al. | 345/207 |
| 2011/0175871 A1* | 7/2011 | Katoh et al. | 345/207 |
| 2011/0221738 A1* | 9/2011 | Murai et al. | 345/212 |

* cited by examiner

METHOD FOR DRIVING TOUCH PANEL

BACKGROUND OF THE INVENTION

1. Field of the Invention

The present invention relates to a touch panel including a photo sensor and a driving method thereof. In particular, the present invention relates to a touch panel including a plurality of pixels each of which is provided with a photo sensor and relates to a driving method thereof. Further, the invention relates to electronic devices including the touch panel.

2. Description of the Related Art

In recent years, a display device provided with a touch sensor has attracted attention. The display device provided with the touch sensor is called a touch panel a touch screen, and the like (hereinafter simply referred to as a "touch panel"). Examples of the touch sensor include a resistive touch sensor, a capacitance touch sensor, and an optical touch sensor, depending on its operation principle. In any of the sensors, when an object to be detected is in contact with a display device or in the vicinity of the display device, data can be input.

By providing of a sensor (also referred to as a "photo sensor") that detects light as an optical touch sensor for a touch panel, a display screen serves as an input region. As an example of a device including such an optical touch sensor, a display device having an image capturing function, which is provided with a contact type area sensor that captures an image, is given (e.g., see Patent Document 1). In the case of a touch panel including an optical touch sensor, light is emitted from a touch panel. In the case where an object to be detected exists at an arbitrary position of the touch panel, light at the region where the object to be detected exists is blocked by the object to be detected, and part of light is reflected. A photo sensor (also referred to as a "photoelectric conversion element") which can detect light is provided in a pixel of the touch panel, and the photo sensor detects the reflected light, so that the existence of the object to be detected in the region where light is detected can be recognized.

In addition, providing a personal authentication function or the like for an electronic device such as a mobile phone or a portable information terminal has been attempted (e.g., see Patent Document 2). A fingerprint, a face, a handprint, a palm print, a pattern of a hand vein, and the like are used for personal authentication. In the case where a portion different from the display portion has a personal authentication function, the number of components increases, and the weight or price of the electronic device could possibly increase.

In addition, in touch sensor systems, a technique for selecting an image processing method by which the position of a finger-tip is detected in accordance with brightness of external light has been known (e.g., see Patent Document 3).

REFERENCE

Patent Document

[Patent Document 1] Japanese Published Patent Application No. 2001-292276
[Patent Document 2] Japanese Published Patent Application No. 2002-033823
[Patent Document 3] Japanese Published Patent Application No. 2007-183706

SUMMARY OF THE INVENTION

When a touch panel is used for an electronic device having a personal authentication function, electrical signals which are generated by photo sensors provided in respective pixels of the touch panel by detecting light are collected and image processing needs to be performed. In particular, high-speed operation of photo sensors is needed in order to realize electronic devices having a personal authentication function with high resolution and high-speed operation.

It is an object of one embodiment of the present invention to provide a touch panel in which a frame frequency of imaging can be enhanced by independently controlling reset operation and readout operation of a photo sensor.

It is another object of one embodiment of the present invention to provide a method for driving a touch panel capable of high-speed imaging.

A touch panel in one embodiment of the present invention includes a plurality of pixels each of which includes a display element and a photo sensor, and a control circuit capable of independently controlling reset operation and readout operation of the photo sensor, and performs the reset operation and the readout operation without temporal overlap.

One embodiment of the present invention is a method for driving a touch panel including a plurality of pixels each of which is provided with a photo sensor having a photodiode, a first transistor, and a second transistor, in which each pixel performs first operation in which a potential of a photodiode reset signal line electrically connected to the photodiode is set so that a forward bias is applied to the photodiode, second operation in which a potential of a gate of the first transistor is changed by a photocurrent of the photodiode, and third operation in which a potential of a gate of the second transistor is changed and a photo sensor output signal line electrically connected to one of a source and a drain of the second transistor and a photo sensor reference signal line electrically connected to one of a source and a drain of the first transistor are brought into conduction through the first transistor and the second transistor so that the potential of the photo sensor output signal line is changed in accordance with the photocurrent.

Another embodiment of the present invention is a method for driving a touch panel including a plurality of pixels each of which is provided with a photo sensor having a photodiode, a first transistor, and a second transistor, in which each pixel performs first operation in which a potential of a photodiode reset signal line electrically connected to the photodiode is set so that a forward bias is applied to the photodiode, second operation in which a potential of a gate of the first transistor is changed by a photocurrent of the photodiode, and third operation in which a potential of a gate of the second transistor is changed and a photo sensor output signal line electrically connected to one of a source and a drain of the first transistor and a photo sensor reference signal line electrically connected to one of a source and a drain of the second transistor are brought into conduction through the first transistor and the second transistor so that the potential of the photo sensor output signal line is changed in accordance with the photocurrent.

In the above methods for driving a touch panel in embodiments of the present invention, simultaneously with the first operation in one of the plurality of pixels, the third operation in another one of the plurality of pixels is performed.

In the above methods for driving a touch panel in embodiments of the present invention, during interval between the first operation in one of the plurality of pixels and the first operation in a pixel adjacent to the pixel in the row direction, the third operation in another one of the plurality of pixels is performed. Here, the term "the row direction" means a direction in which the number denoting a corresponding row increases, as an example.

In the above methods for driving a touch panel in embodiments of the present invention, during interval between the third operation in one of the plurality of pixels and the third operation in a pixel adjacent to the pixel in the row direction, the first operation by another one of the plurality of pixels is performed.

With one embodiment of the present invention, it is possible to provide a touch panel capable of high-speed imaging.

In addition, with one embodiment of the present invention, it is possible to provide a method for driving a touch panel capable of high-speed imaging with an operation time of a photo sensor secured.

Further, with one embodiment of the present invention, it is possible to provide a method for driving a touch panel capable of high-speed imaging with stable operation of a photo sensor.

DETAILED DESCRIPTION OF THE INVENTION

Figure 1:
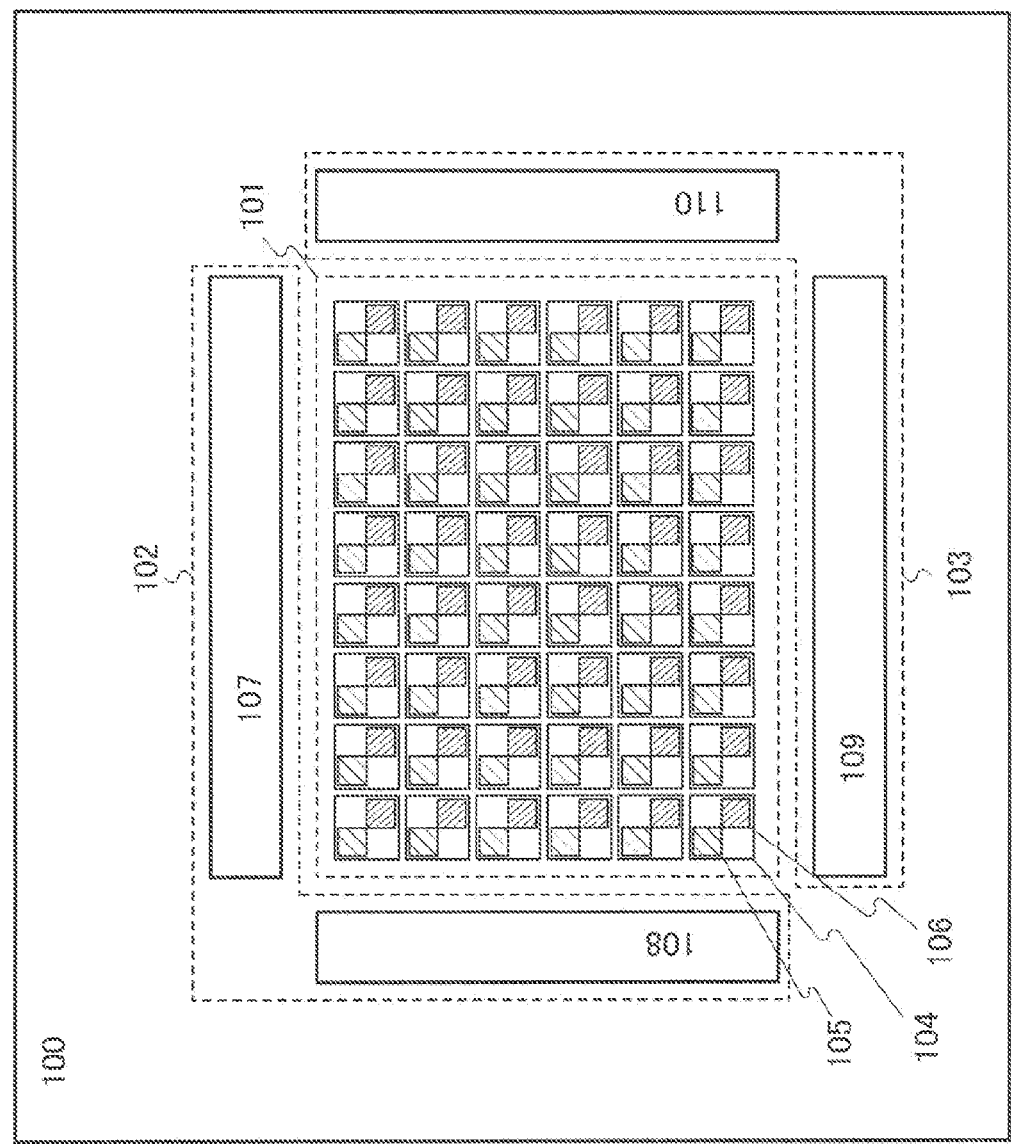
FIG. 1 illustrates an example of a structure of a touch panel.

Hereinafter, embodiments will be described in detail with reference to the accompanying drawings. However, since embodiments described below can be embodied in many different modes, it is easily understood by those skilled in the art that the mode and the detail can be variously changed without departing from the scope of the present invention. Therefore, the present invention should not be interpreted as being limited to the description of the embodiments below. In the drawings for describing the embodiments, the same parts or parts having a similar function are denoted by the same reference numerals, and description of such parts is not repeated.

Embodiment 1

In this embodiment, a structure of a touch panel in one embodiment of the present invention and a driving method thereof are described with reference to FIG. 1, FIG. 2, FIG. 3, FIG. 4, FIG. 7, FIG. 10, and FIG. 11.

An example of a structure of a touch panel is described with reference to FIG. 1. A touch panel 100 includes a pixel circuit 101, a display element control circuit 102, and a photo sensor control circuit 103. The pixel circuit 101 includes a plurality of pixels 104 arranged in a matrix of rows and columns. Each of the pixels 104 includes a display element 105 and a photo sensor 106.

Each of the display elements 105 includes a thin film transistor (TFT), a storage capacitor, a liquid crystal element including a liquid crystal layer, and the like. The thin film transistor has a function of controlling injection or ejection of charge to/from the storage capacitor. The storage capacitor has a function of holding charge which corresponds to voltage applied to the liquid crystal layer. Utilizing the change in the direction of a polarization due to a voltage application to the liquid crystal layer, tone of light passing through the liquid crystal layer is made (gray scale display is performed), so that image display is realized. Light that a light source (a backlight) emits from the rear side of a liquid crystal display device is used as the light passing through the liquid crystal layer.

Note that methods of displaying color images include a method in which a color filter is used, that is, a color filter method. This method makes it possible to perform the gray scale display of a particular color (e.g., red (R), green (G), or blue (B)) when light that has passed through the liquid crystal layer passes through a color filter.

Methods of displaying color images also include a method in which respective light sources of particular colors (e.g., red (R), green (G), and blue (B)) are used as a backlight, and are sequentially lit, that is, a field-sequential method. In the field-sequential method, the gray scale display of each of the colors can be performed by making the tone of light passing through the liquid crystal layer while the light source thereof is turned on.

The case where the display elements 105 include liquid crystal elements is described above; however, other elements such as light emitting elements may be included as the display elements 105. The light emitting element is an element in which the luminance is controlled by current or voltage. Specifically, light emitting diode, organic light emitting diode (OLED), and the like are given.

The photo sensors 106 each include an element such as a photodiode, which has a function of generating an electrical signal when receiving light, and a thin film transistor. Note that as light which is received by the photo sensors 106, reflected light obtained when light from a backlight is delivered to an object to be detected is used.

The display element control circuit 102 controls the display elements 105 and includes a display element driver circuit 107 (also referred to as a signal line driver circuit for display elements 107) and a display element driver circuit 108 (also referred to as a scan line driver circuit for display elements 108). The display element driver circuit 107 inputs a signal to the display elements 105 through signal lines (also referred to as "source signal lines") such as video data signal lines. The display element driver circuit 108 inputs a signal to the display elements 105 through scanning lines (also referred to as "gate signal lines").

For example, the scan line driver circuit for display elements 108 has a function of selecting display elements 105 included in the pixels 104 placed in a particular row. Further, the signal line driver circuit for display elements 107 has a function of giving a predetermined potential to the display elements 105 included in the pixels 104 placed in the selected row. Note that in the pixels to which the scan line driver circuit for display elements 108 gives a high potential, the thin film transistors are brought into conduction and charges given by the signal line driver circuit for display elements 107 are supplied to the display elements.

The photo sensor control circuit 103 controls the photo sensor 106 and includes a photo sensor readout circuit 109 connected to a photo sensor output signal line and a photo sensor reference signal line, and a photo sensor driver circuit 110. The photo sensor driver circuit 110 has a function of performing reset operation and selecting operation on the photo sensors 106 included in the pixels 104 placed in a particular row, which are described below.

Further, the photo sensor readout circuit 109 has a function of taking out output signals of the photo sensors 106 included in the pixels 104 in the selected row. Note that the photo sensor readout circuit 109 can have a system in which an output, which is an analog signal, of the photo sensor 106 is extracted as an analog signal to the outside of the touch panel by an OP amplifier; or a system in which the output is converted into a digital signal by an A/D converter circuit and then extracted to the outside of the touch panel.

An example of a circuit diagram of the pixel 104 is described with reference to FIG. 2. The pixel 104 includes the display element 105 including a transistor 201, a storage capacitor 202, and a liquid crystal element 203, and the photo sensor 106 including a photodiode 204, a transistor 205, and a transistor 206.

A gate of the transistor 201 is electrically connected to a gate signal line 207, one of a source and a drain of the transistor 201 is electrically connected to a video data signal line 210, and the other of the source and the drain of the transistor 201 is electrically connected to one electrode of the storage capacitor 202 and one electrode of the liquid crystal element 203. The other electrode of the storage capacitor 202 and the other electrode of the liquid crystal element 203 are each held at a certain potential. The liquid crystal element 203 is an element including a pair of electrodes and a liquid crystal layer interposed between the pair of electrodes.

When a potential at a high level "H" is applied to the gate signal line 207, the transistor 201 applies the potential of the video data signal line 210 to the storage capacitor 202 and the liquid crystal element 203. The storage capacitor 202 holds the applied potential. The liquid crystal element 203 changes light transmittance in accordance with the applied potential.

One electrode of the photodiode 204 is electrically connected to a photodiode reset signal line 208, and the other electrode of the photodiode 204 is electrically connected to a gate of the transistor 205 through a gate signal line 213. One of a source and a drain of the transistor 205 is electrically connected to a photo sensor reference signal line 212, and the other of the source and the drain of the transistor 205 is electrically connected to one of a source and a drain of the transistor 206. A gate of the transistor 206 is electrically connected to a gate signal line 209, and the other of the source and the drain of the transistor 206 is electrically connected to a photo sensor output signal line 211.

Figure 2:
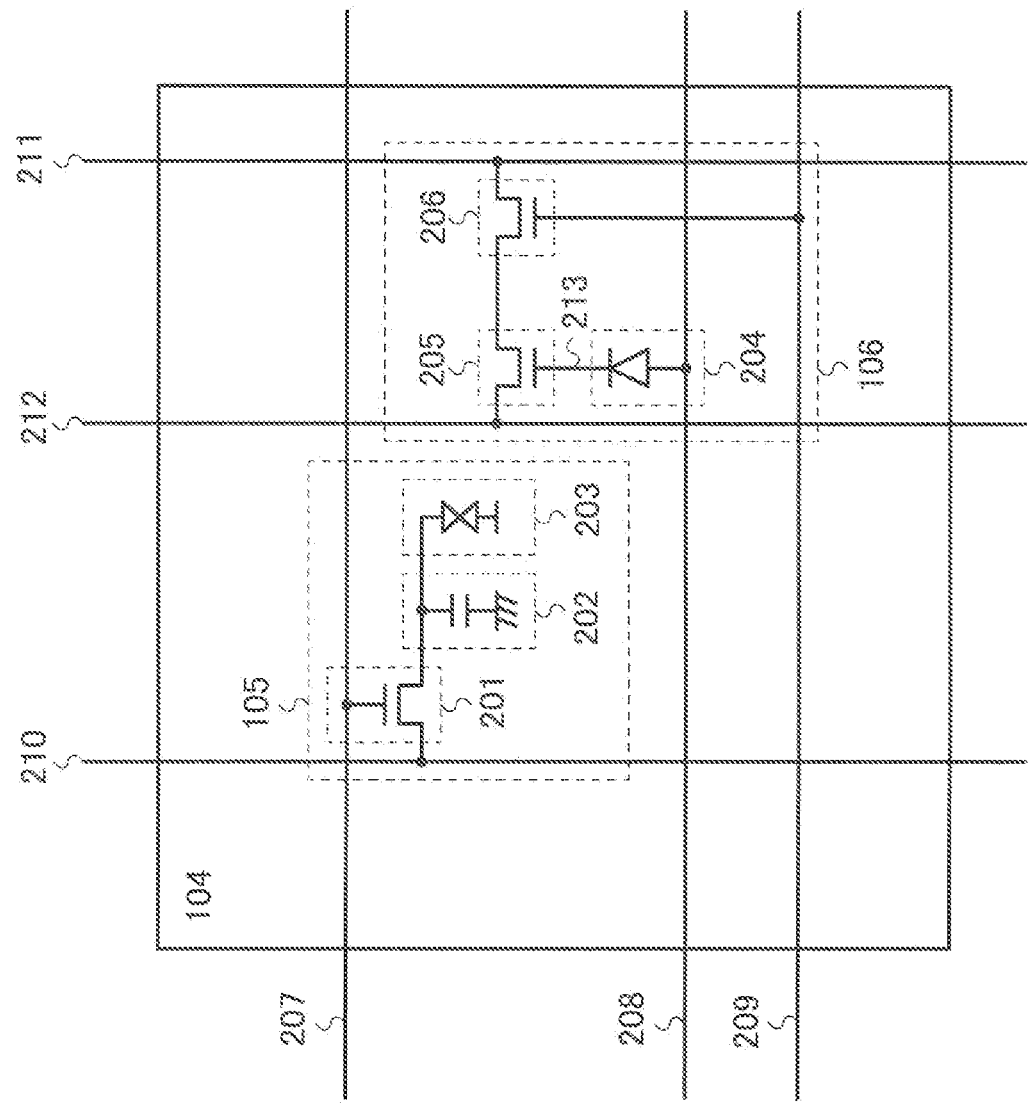
FIG. 2 illustrates an example of a circuit diagram of a pixel.
Figure 12:
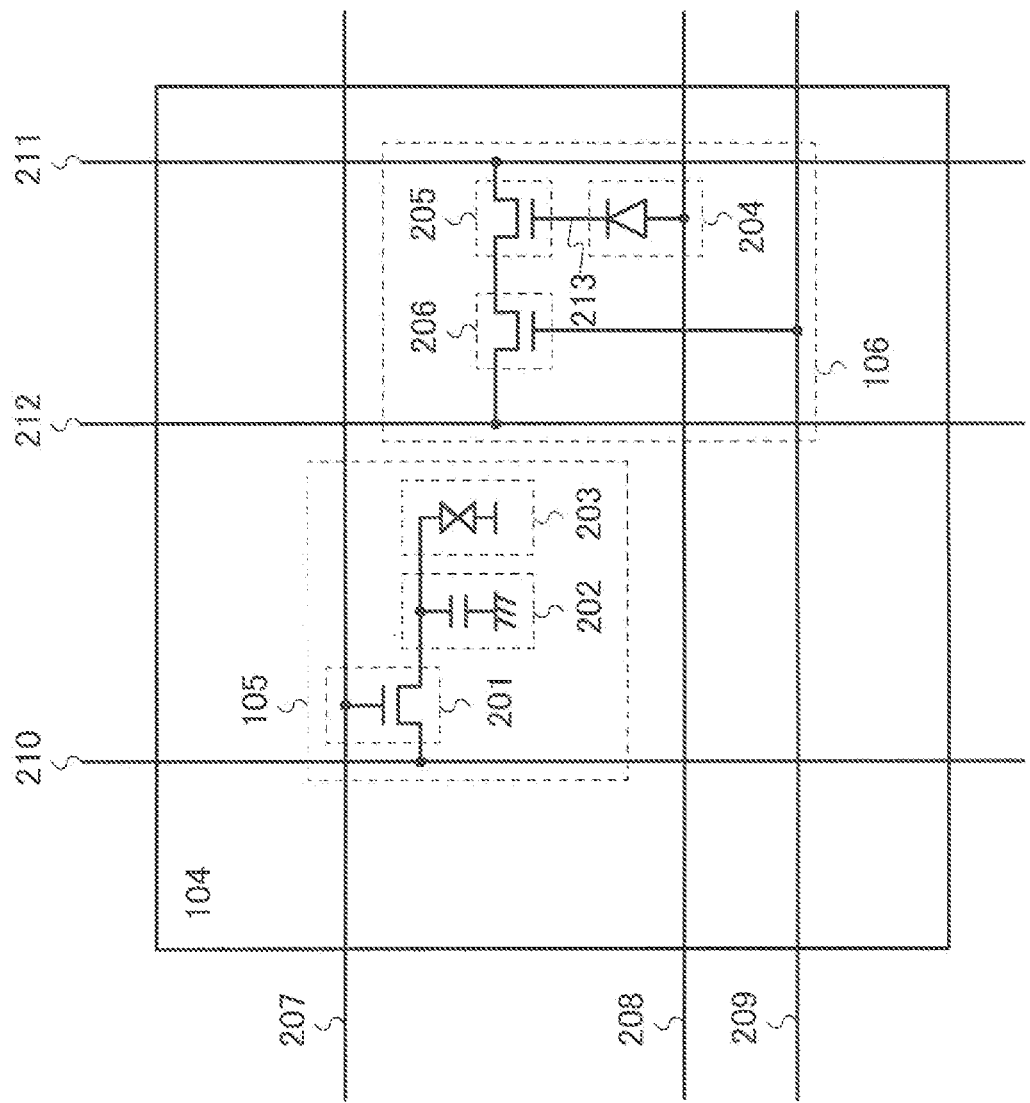
FIG. 12 illustrates an example of a circuit diagram of a pixel.

Note that the arrangement of the transistor 205 and the transistor 206 is not limited to the configuration in FIG. 2. As shown in FIG. 12, it is acceptable to employ the following configuration: one of the source and the drain of the transistor 206 is electrically connected to the photo sensor reference signal line 212, the other of the source and the drain of the transistor 206 is electrically connected to one of the source and the drain of the transistor 205, and the gate of the transistor 206 is electrically connected to the gate signal line 209, the gate of the transistor 205 is electrically connected to the gate signal line 213, and the other of the source and the drain of the transistor 205 is electrically connected to the photo sensor output signal line 211, and one electrode of the photodiode 204 is electrically connected to the photodiode reset signal line 208, and the other electrode of the photodiode 204 is electrically connected to the gate of the transistor 205 through the gate signal line 213.

Figure 3:
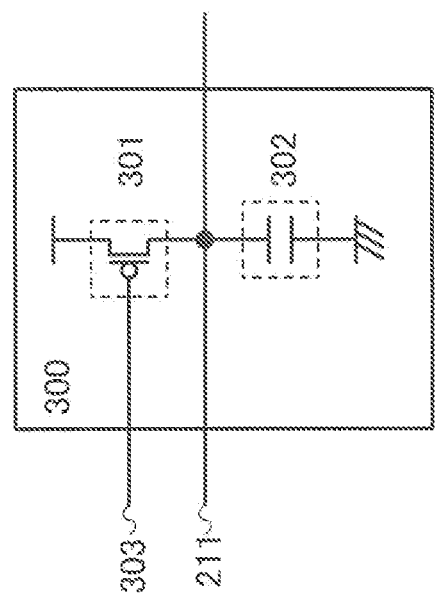
FIG. 3 illustrates an example of a configuration of a photo sensor readout circuit.

Next, an example of a configuration of the photo sensor readout circuit 109 is described with reference to FIG. 3. The photo sensor readout circuit 109 includes a plurality of circuits 300. Each of the plurality of circuits 300 corresponds to one column of pixels 104 among the plurality of pixels included in the pixel circuit 101. As shown in FIG. 3, the circuit 300 which corresponds to one column of the pixels and is included in the photo sensor readout circuit 109 includes a p-channel transistor 301 and a storage capacitor 302. In addition, the reference numeral 211 denotes the photo sensor output signal line which corresponds to the column of pixels, and the reference numeral 303 denotes a precharge signal line.

In the circuit 300 which corresponds to one column of the pixels and is included in the photo sensor readout circuit 109, the potential of the photo sensor output signal line 211 is set to a reference potential before operation of the photo sensor 106 in the pixel 104. In FIG. 3, by setting a potential of the precharge signal line 303 at a low level "L", the potential of the photo sensor output signal line 211 can be set to a high potential which is a reference potential.

Note that the storage capacitor 302 is not necessarily provided in the case where the parasitic capacitance of the photo sensor output signal line 211 is large.

Note also that the reference potential can be a low potential. In that case, an n-channel transistor is used instead of the p-channel transistor 301 and the potential of the precharge signal line 303 is set at the potential "H", whereby the potential of the photo sensor output signal line 211 can be set to a low potential which is a reference potential.

Figure 4:
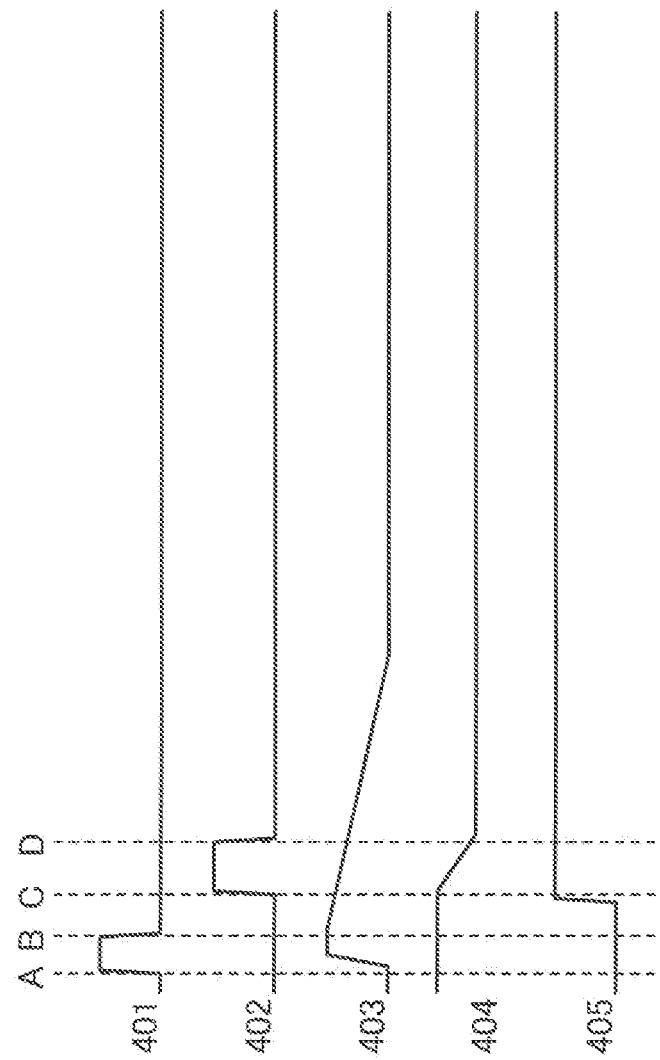
FIG. 4 is a timing chart of an example of readout operation of a photo sensor.

Next, an example of readout operation of the photo sensor 106 in a touch panel is described with reference to a timing chart of FIG. 4. In FIG. 4, signals 401 to 404 respectively correspond to the potential of the photodiode reset signal line 208, the potential of the gate signal line 209 to which the gate of the transistor 206 is connected, the potential of a gate signal line 213 to which the gate of the transistor 205 is connected, and the potential of the photo sensor output signal line 211 in FIG. 2. In addition, a signal 405 corresponds to the potential of the precharge signal line 303 in FIG. 3.

In a time A, when the potential of the photodiode reset signal line 208 (the signal 401) is set at the potential "H", in other words, the potential of the photodiode reset signal line which is electrically connected to the photodiode is set so that a forward bias is applied to the photodiode (reset operation), the photodiode 204 is brought into conduction and the potential of the gate signal line 213 (the signal 403) to which the gate of the transistor 205 is connected is set at the potential "H". In addition, when the potential of the precharge signal line 303 (the signal 405) is set at the potential "L", the potential of the photo sensor output signal line 211 (the signal 404) is precharged to the potential "H".

In a time B, when the potential of the photodiode reset signal line 208 (the signal 401) is set at the potential "L" (accumulating operation), the potential of the gate signal line 213 to which the gate of the transistor 205 is connected (the signal 403) begins to be lowered due to a photocurrent of the photodiode 204. The photocurrent of the photodiode 204 increases when light is delivered; therefore, the potential of the gate signal line 213 to which the gate of the transistor 205 is connected (the signal 403) varies in accordance with the amount of the light delivered. That is, current between a source and a drain of the transistor 205 varies.

In a time C, when the potential of the gate signal line 209 (the signal 402) is set at the potential "H" (selecting operation), the transistor 206 is brought into conduction and the photo sensor reference signal line 212 and the photo sensor output signal line 211 are brought into conduction through the transistor 205 and the transistor 206. Then, the potential of the photo sensor output signal line 211 (the signal 404) is decreased. Note that before the time C, the potential of the precharge signal line 303 (the signal 405) is set at the potential "H" and precharge of the photo sensor output signal line 211 is completed. Here, the rate at which the potential of the photo sensor output signal line 211 (the signal 404) decreases depends on the current between the source and the drain of the transistor 205. That is, the rate varies in accordance with the amount of light which is delivered to the photodiode 204.

In a time D, when the potential of the gate signal line 209 (the signal 402) is set at the potential "L", the transistor 206 is turned off, whereby the potential of the photo sensor output signal line 211 (the signal 404) is kept at a fixed value after the time D. Here, the value to be the fixed value varies in accordance with the amount of light which is delivered to the photodiode 204. Therefore, the amount of light which is delivered to the photodiode 204 can be found by obtaining the potential of the photo sensor output signal line 211.

As described above, operation of individual photo sensors is realized by repeating reset operation, accumulating operation, and selecting operation. In order to realize high-speed imaging of a touch panel, it is required to perform the reset operation, the accumulating operation, and the selecting operation of all the pixels at high speed.

Figure 10:
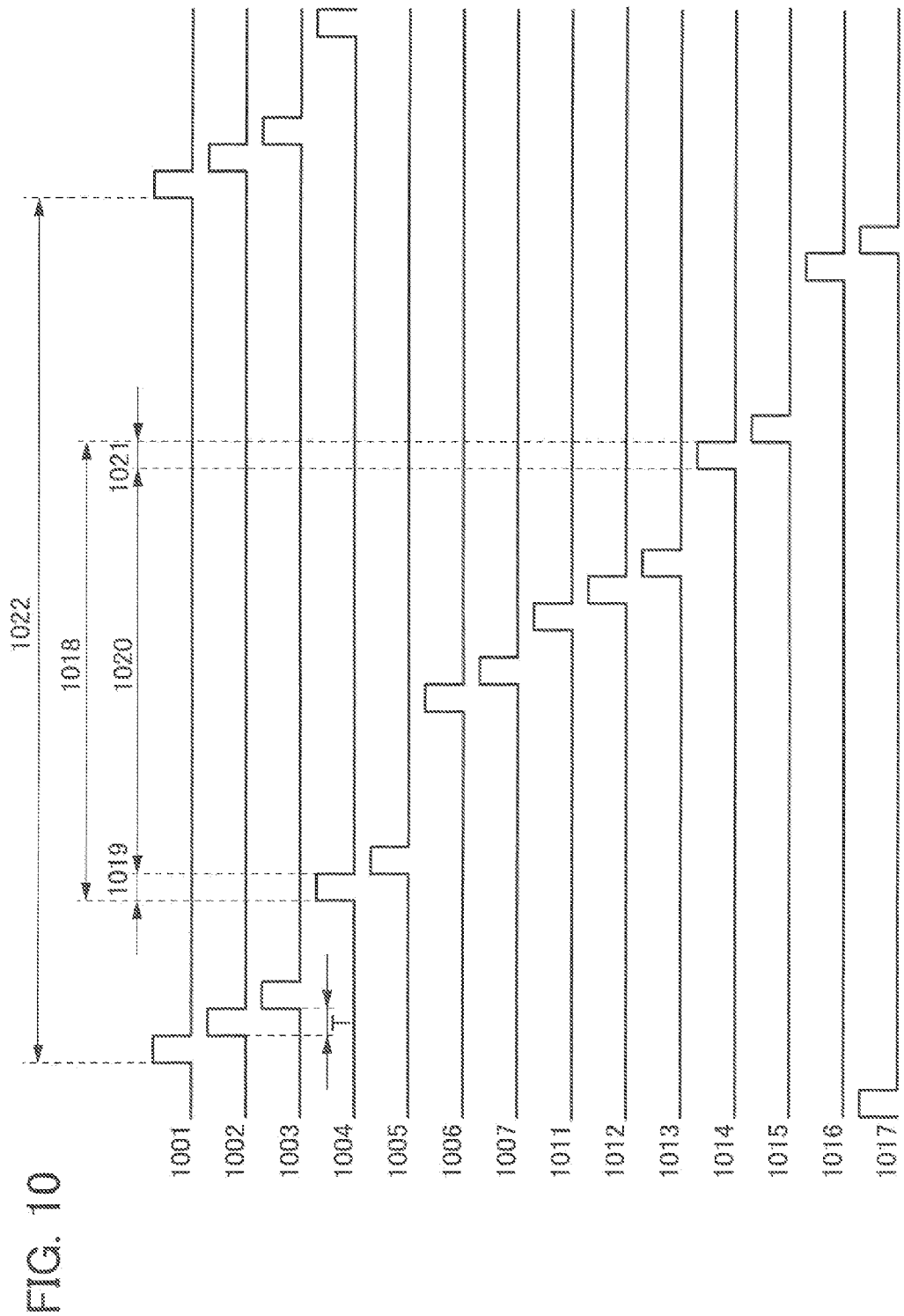
FIG. 10 is a timing chart of an example of operation of a touch panel.

To put it simply, by performing the accumulating operation of all the pixels after the reset operation of all the pixels, and then the selecting operation of all the pixels as shown in the timing chart of FIG. 10, desired imaging can be realized. FIG. 10 is a timing chart showing an example of operation of a touch panel. In the timing chart of FIG. 10, a signal 1001, a signal 1002, a signal 1003, a signal 1004, a signal 1005, a signal 1006, and a signal 1007 correspond to the photodiode reset signal lines 208 in a first row, a second row, a third row, an m-th row, an (m+1)-th row, an (n−1)-th row, and an n-th row, respectively. In addition, in the timing chart, a signal 1011, a signal 1012, a signal 1013, a signal 1014, a signal 1015, a signal 1016, and a signal 1017 correspond to the gate signal lines 209 in the first row, the second row, the third row, the m-th row, the (m+1)-th row, the (n−1)-th row, and the n-th row, respectively. A period 1018 is a period during which the photo sensor in the m-th row is operated, and a period 1019, a period 1020, and a period 1021 are a period during which the reset operation is performed, a period during which the accumulating operation is performed, and a period during which the selecting operation is performed, respectively. Further, a period 1022 is a period which is needed for one-time imaging in all the pixels. Note that m and n are natural numbers and satisfy 1<m<n. Here, a period T illustrated in FIG. 10 indicates a period from the time when reset operation in a row starts until the time when reset operation in a next row starts.

Figure 7:
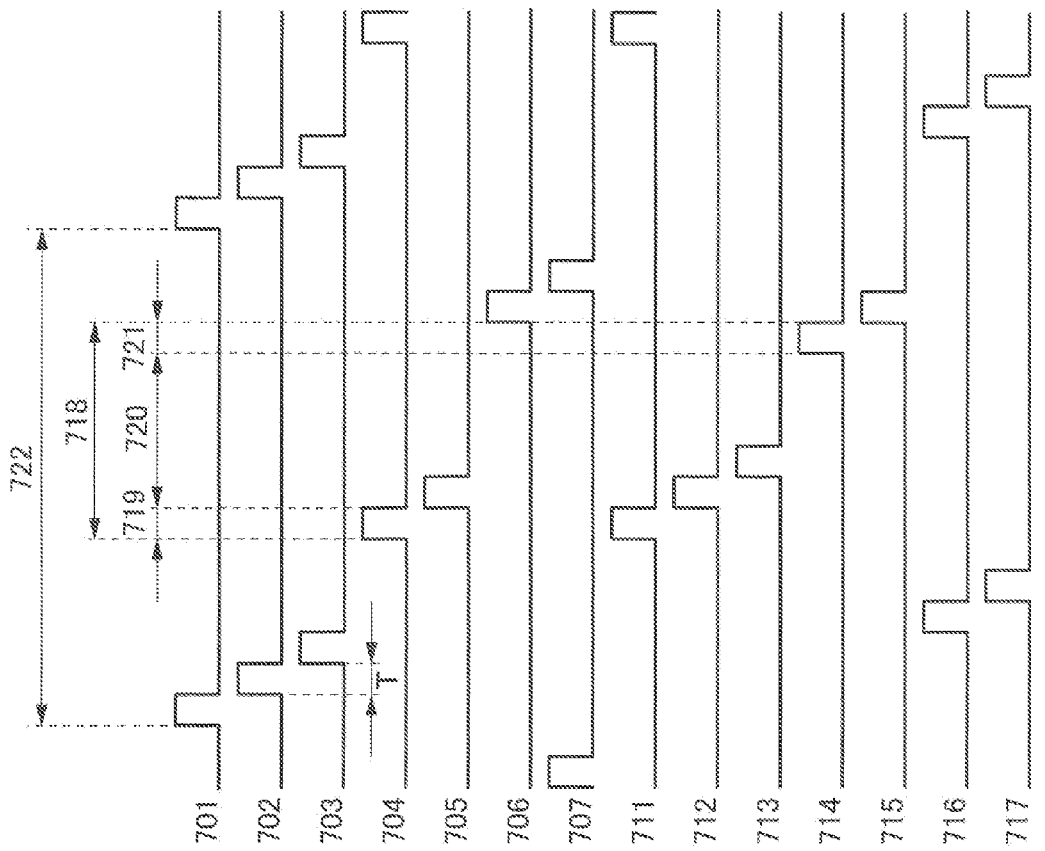
FIG. 7 is a timing chart of an example of operation of a touch panel.

Here, by employing a driving method shown in a timing chart of FIG. 7, high-speed imaging can be easily performed with operation time of individual photo sensors secured.

FIG. 7 is a timing chart showing an example of operation of a touch panel. In the timing chart of FIG. 7, a signal 701, a signal 702, a signal 703, a signal 704, a signal 705, a signal 706, and a signal 707 correspond to the photodiode reset signal lines 208 in a first row, a second row, a third row, an m-th row, an (m+1)-th row, an (n−1)-th row, and an n-th row, respectively. In addition, in the timing chart, a signal 711, a signal 712, a signal 713, a signal 714, a signal 715, a signal 716, and a signal 717 correspond to the gate signal lines 209 in the first row, the second row, the third row, the m-th row, the (m+1)-th row, the (n−1)-th row, and the n-th row, respectively. A period 718 is a period during which the photo sensor in the m-th row is operated, and a period 719, a period 720, and a period 721 are a period during which the reset operation is performed, a period during which the accumulating operation is performed, and a period in which the selecting operation is performed, respectively. Further, a period 722 is a period which is needed for one-time imaging in all the pixels. Note that in and n are natural numbers and satisfy 1<m<n. Here, a period T illustrated in FIG. 7 indicates a period from the time when reset operation in a row starts until the time when reset operation in a next row starts.

By employing a driving method shown in a timing chart of FIG. 7, reset operation, accumulating operation, and selecting operation can be performed simultaneously in different rows. For example, simultaneously with reset operation in a row, selecting operation can be performed in another row. In FIG. 7, reset operation in the m-th row and selecting operation in the first row are performed simultaneously.

Here, in the case where a period of reset operation and selecting operation of photo sensors in each row in the timing chart of FIG. 7 is set in the same manner as the timing chart of FIG. 10, a period needed for one-time imaging in the whole screen (the period 722) in the timing chart of FIG. 7 can be shorter than that of FIG. 10 (the period 1022). Therefore, with the driving method shown in the timing chart of FIG. 7, the speed for imaging can be higher than that with the driving method shown in the timing chart of FIG. 10 by enhancing the frame frequency of imaging.

Therefore, by employing the driving method shown in the timing chart of FIG. 7, with an operation time for each photo sensor secured, high-speed imaging can be performed by enhancing the frame frequency of imaging.

Note that, in order to realize the driving method shown in the timing chart of FIG. 7, it is preferable that the photo sensor driver circuit 110 independently include a driver circuit for controlling reset operation and a driver circuit for controlling selecting operation. For example, it is preferable that the driver circuit for controlling reset operation be formed using a first shift register and that the driver circuit for controlling selecting operation be formed using a second shift register.

Figure 11:
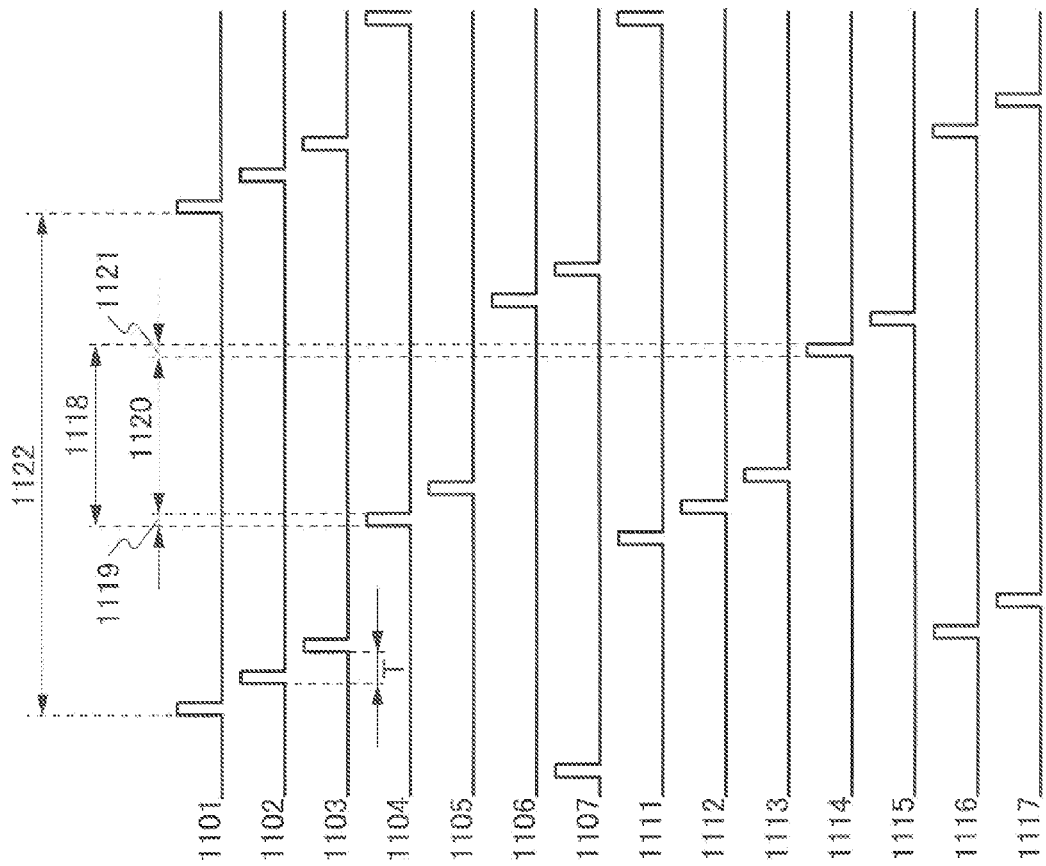
FIG. 11 is a timing chart of an example of operation of a touch panel.

Further, by employing the driving method of the timing chart shown in FIG. 11, stable operation of the photo sensors can be achieved.

In the timing chart of FIG. 11, a signal 1101, a signal 1102, a signal 1103, a signal 1104, a signal 1105, a signal 1106, and a signal 1107 correspond to the photodiode reset signal line 208 in a first row, a second row, a third row, an m-th row, an (m+1)-th row, an (n−1)-th row, and an n-th row, respectively. In addition, in the timing chart, a signal 1111, a signal 1112, a signal 1113, a signal 1114, a signal 1115, a signal 1116, and a signal 1117 correspond to the gate signal line 209 in the first row, the second row, the third row, the m-th row, the (m+1)-th row, the (n−1)-th row, and the n-th row, respectively. A period 1118 is a period in which the photo sensor in the m-th row is operated, and a period 1119, a period 1120, and a period 1121 are a period during which the reset operation is performed, a period during which the accumulating operation is performed, and a period during which the selecting operation is performed, respectively. Further, a period 1122 is a period which is needed for one-time imaging in all the pixels. Here, a period T illustrated in FIG. 11 indicates a period from the time when reset operation in a row starts until the time when reset operation in a next row starts. In the timing chart of FIG. 10, selecting operation is not made for all rows during the period T; however, in the timing chart of FIG. 11, selecting operation is made for a certain row during the period T.

By employing the driving method shown in the timing chart of FIG. 11, it is possible not to simultaneously perform reset operation and selecting operation in different rows without a change in operation frequency of the driver circuit for controlling reset operation and the driver circuit for controlling selecting operation. For example, during interval between reset operation in a row and reset operation in an adjacent row, by performing selecting operation in another row, it is possible not to simultaneously perform reset operation and selecting operation. In FIG. 11, during interval between reset operation in the m-th row and reset operation in the (m+1)-th row, selecting operation in the second row is performed. Further, for example, during interval between selecting operation in a row and selecting operation in an adjacent row, by performing reset operation in another row, it is possible not to simultaneously perform reset operation and selecting operation. In FIG. 11, during interval between selecting operation in the first row and selecting operation in the second row, reset operation in the m-th row is performed.

By employing the driving method shown in the timing chart of FIG. 11, an influence of change in a potential of the photo sensor output signal line, which is caused by photo sensors in the row where selecting operation is performed, on reset operation of a photo sensor in another row can be significantly reduced. Therefore, by employing the driving method shown in the timing chart of FIG. 11, stable operation of photo sensors can be achieved.

Here, the influence on reset operation is attributed to leakage current that flows from the photo sensor output signal line 211 through the transistor 205 to the photo sensor reference signal line 212 due to off leakage current of the transistor 206 in FIG. 2. Due to the influence on reset operation, malfunctions of photo sensor operation could possibly be caused, such as the case where the gate voltage of the transistor 205 does not reach a desired voltage during reset operation or the case where a potential of the photo sensor output signal line 211 and a potential of the photo sensor reference signal line 212 become unstable by the leakage current.

Therefore, by employing the driving method shown in the timing chart of FIG. 11, with stable operation of the photo sensor, high-speed imaging is possible by enhancing the frame frequency of imaging.

Note that, in the driving method shown in the timing chart of FIG. 11, it is also effective to set a potential of the photo sensor output signal line to the same level as a potential of the photo sensor reference signal line during a reset period.

Note that, in order to realize the driving method shown in the timing chart of FIG. 11, it is preferable that the photo sensor driver circuit 110 independently includes a driver circuit for controlling reset operation and a driver circuit for controlling selecting operation. For example, it is effective that the driver circuit for controlling reset operation is formed using a first shift register, the driver circuit for controlling selecting operation is formed using a second shift register, and that control signals in each row are generated by logical sum of a signal for setting the potential "H" only during a desired period and output of each shift register.

With the above structure, it is possible to secure an operation time and to provide a touch panel including a photo sensor capable of high-speed imaging. In addition, it is possible to provide a method for driving a touch panel capable of high-speed imaging with the operation time of the photo sensor secured.

In addition, with the above configuration, it is possible to provide a touch panel including a photo sensor capable of high-speed imaging with stable operation. In addition, it is possible to provide a method for driving a touch panel capable of high-speed imaging with the stable operation of the photo sensor.

Embodiment 2

In this embodiment, a structure of a touch panel in one embodiment of the present invention is described with reference to FIG. 5.

Figure 5:
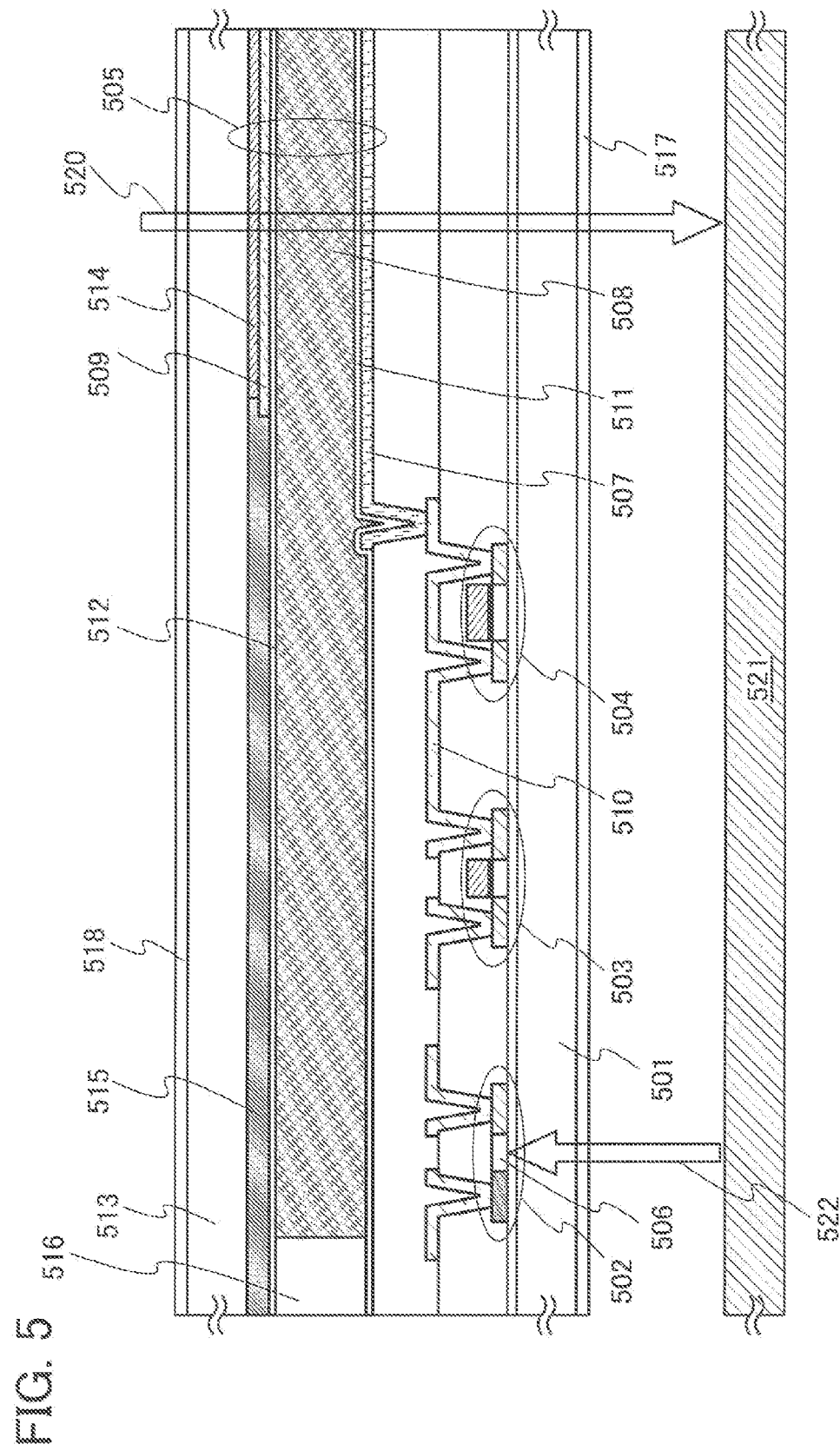
FIG. 5 illustrates an example of a cross section of a touch panel.

FIG. 5 illustrates an example of a cross-sectional view of the touch panel. In the touch panel illustrated in FIG. 5, a photodiode 502, a transistor 503, a storage capacitor 504, and a liquid crystal element 505 are formed over a substrate 501 (a TFT substrate) having an insulating surface.

The photodiode 502 and the storage capacitor 504 can be formed concurrently with the transistor 503 in a manufacturing process of the transistor 503. The photodiode 502 is a lateral-junction pin diode. A semiconductor film 506 included in the photo diode 502 has a region having p-type conductivity (a p-type layer), a region having i-type conductivity (an i-type layer), and a region having n-type conductivity (an n-type layer). Note that although the touch panel in which the photodiode 502 is a pin diode is shown in FIG. 5, the photodiode 502 may be a pn diode. Lateral pin junction or lateral pn junction can be formed by adding an impurity element imparting p-type conductivity and an impurity element imparting n-type conductivity to respective particular regions in the semiconductor film 506.

In addition, by processing (patterning) one semiconductor film formed over the substrate 501 into a desired shape by etching or the like, an island-like semiconductor film of the photodiode 502 can be formed together with an island-like semiconductor film of the transistor 503. As a result, cost can be reduced because a process for forming part of the photodiode does not need to be added to a normal process for forming a panel in which pixels including transistors and the like are formed.

The liquid crystal element 505 includes a pixel electrode 507, liquid crystal 508, and a counter electrode 509. The pixel electrode 507 is formed over the substrate 501 and is electrically connected to the transistor 503 through the storage capacitor 504 and a conductive film 510. In addition, the counter electrode 509 is formed on the substrate 513 (a counter substrate) and the liquid crystal 508 is interposed between the pixel electrode 507 and the counter electrode 509. Note that although a transistor used for a photo sensor is not illustrated in the touch panel in FIG. 5, the transistor can be formed over the substrate 501 together with the transistor 503 in the manufacturing process for the transistor 503.

A cell gap between the pixel electrode 507 and the counter electrode 509 can be controlled by using a spacer 516. In FIG. 5, the cell gap is controlled by using the columnar spacer 516 selectively formed by photolithography. Alternatively, the cell gap can be controlled by dispersing spherical spacers between the pixel electrode 507 and the counter electrode 509.

In addition, the liquid crystal 508 is surrounded by a sealing material between the substrate 501 and the substrate 513. The liquid crystal 508 may be injected by a dispenser method (droplet method) or a dipping method (pumping method).

For the pixel electrode 507, a light-transmitting conductive material such as indium tin oxide (ITO), indium tin oxide containing silicon oxide (ITSO), organic indium, organic tin, indium zinc oxide (IZO) containing zinc oxide (ZnO), zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide containing titanium oxide, or the like can be used.

In addition, since the transparent liquid crystal element 505 is given as an example in this embodiment, the above-described light-transmitting conductive material can be used also for the counter electrode 509 as in the case of the pixel electrode 507.

An alignment film 511 is provided between the pixel electrode 507 and the liquid crystal 508, and an alignment film 512 is provided between the counter electrode 509 and the liquid crystal 508. The alignment film 511 and the alignment film 512 can be formed using an organic resin such as polyimide or polyvinyl alcohol. An alignment treatment such as rubbing is performed on their surfaces in order to align liquid crystal molecules in certain direction. Rubbing can be performed by rolling a roller wrapped with cloth of nylon or the like while applying pressure on the alignment film so that the surface of the alignment film is rubbed in certain direction. Note that by using an inorganic material such as silicon oxide, the alignment film 511 and the alignment film 512 each having an alignment property can be directly formed by evaporation method without performing an alignment treatment.

Further, a color filter 514 through which light in a particular wavelength range can pass is formed over the substrate 513 so as to overlap with the liquid crystal element 505. The color filter 514 can be selectively formed by photolithography after application of an organic resin such as an acrylic-based resin in which colorant is dispersed on the substrate 513. Alternatively, the color filter 514 can be selectively formed by etching after application of a polyimide-based resin in which colorant is dispersed on the substrate 513. Alternatively, the color filter 514 can be selectively formed by a droplet discharge method such as an ink jet method.

Furthermore, a shielding film 515 which can block light is formed over the substrate 513 so as to overlap with the photodiode 502. By providing the shielding film 515, light from a backlight that passes through the substrate 513 and enters the touch panel can be prevented from being directly delivered to the photodiode 502. Further, disclination due to disorder of alignment of the liquid crystal 508 among pixels can be prevented from being viewed. An organic resin containing black colorant such as carbon black or titanium lower oxide in which the number of oxides is smaller than that of titanium dioxide can be used for the shielding film 515. Alternatively, a film formed using chromium can be used for the shielding film 515.

Furthermore, a polarizing plate 517 is provided on a surface which is the opposite side of a surface of the substrate 501 over which the pixel electrode 507 is formed, and a polarizing plate 518 is provided on a surface which is the opposite side of a surface of the substrate 513 on which the counter electrode 509 is formed.

Light from the backlight passes through the liquid crystal element 505 and is delivered to an object to be detected 521 on the substrate 501 side as shown by an arrow 520. Then, light reflected by the object to be detected 521 enters the photodiode 502 as shown by an arrow 522.

The liquid crystal element may be a TN (twisted nematic) mode liquid crystal element, a VA (vertical alignment) mode liquid crystal element, an OCB (optically compensated birefringence) mode liquid crystal element, an IPS (in-plane switching) mode liquid crystal element, or the like. Note that although the liquid crystal element 505 in which the liquid crystal 508 is interposed between the pixel electrode 507 and the counter electrode 509 is described as an example in this embodiment, the touch panel in one embodiment of the present invention is not limited to this structure. A liquid crystal element in which a pair of electrodes is formed on the substrate 501 side like an IPS mode liquid crystal element may also be employed.

In addition, although an example in which a thin semiconductor film is used for the photodiode 502, the transistor 503, and the storage capacitor 504 is illustrated in this embodiment, a single crystal semiconductor substrate, an SOI substrate, or the like may also be used.

With the above structure, it is possible to provide a touch panel capable of high-speed imaging. In addition, it is possible to provide a method for driving the touch panel capable of high-speed imaging.

Embodiment 3

In this embodiment, another structure of a touch panel in one embodiment of the present invention is described with reference to FIG. 6.

Figure 6:
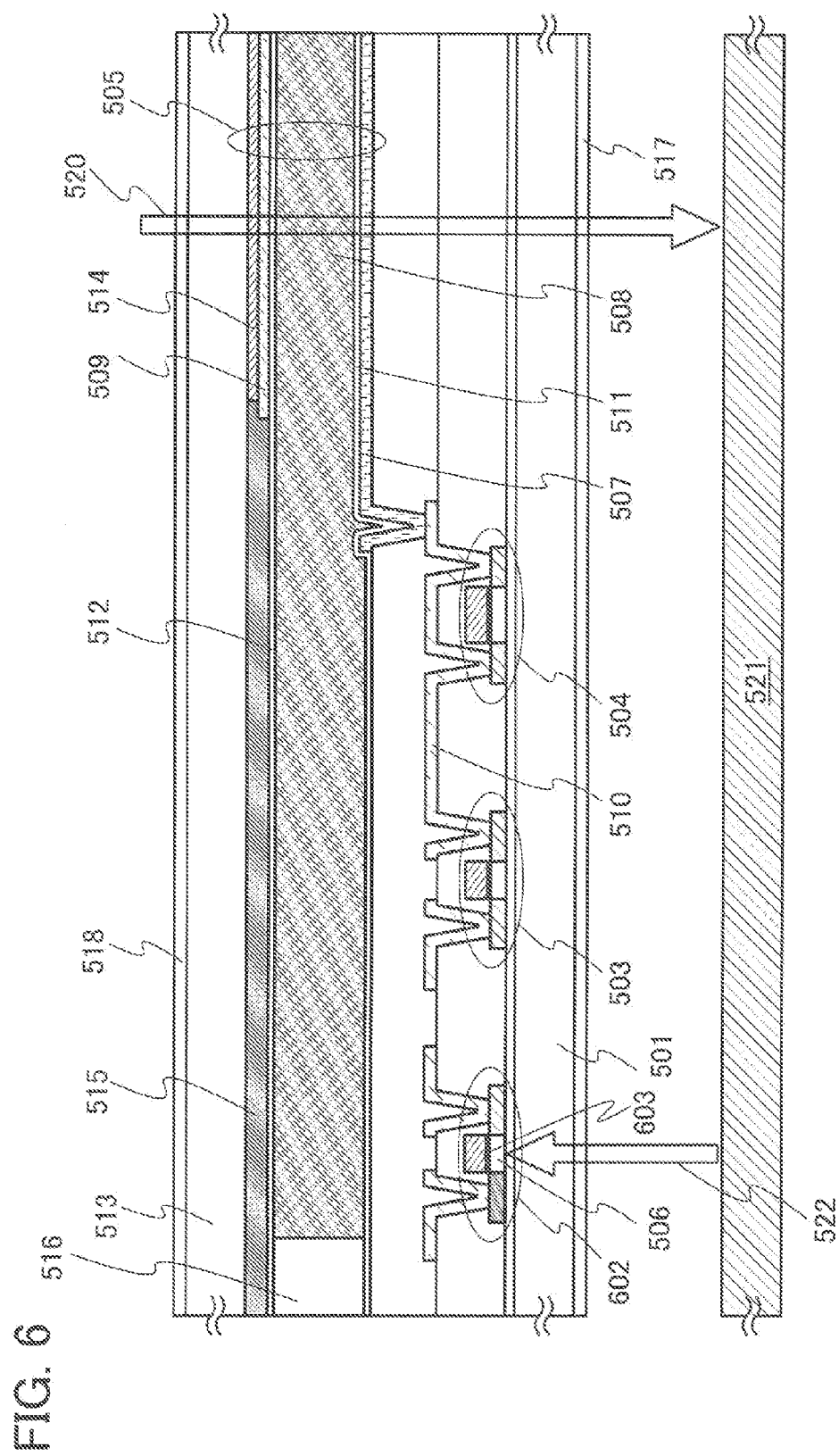
FIG. 6 illustrates an example of a cross section of a touch panel.

FIG. 6 illustrates an example of a cross-sectional view of the touch panel, which is different from that in Embodiment 2. In the touch panel illustrated in FIG. 6, a photodiode 602 differs from a photodiode 502 in FIG. 5 in having a shielding film 603 formed using a conductive film that is used for a gate electrode of a transistor 503. By providing the shielding film 603 in the photodiode 602, light from the backlight can be prevented from directly entering a region that has i-type conductivity (an i-type layer), and only light reflected by the object to be detected 521 can be efficiently detected.

In addition, in the case where the photodiode 602 serves as a lateral pin diode, a region that has p-type conductivity (a p-type layer) and a region that has n-type conductivity (an n-type layer) can be formed in a self-aligned manner by using the shielding film 603 as a mask. This is effective in manufacturing a small photodiode, in reducing the pixel size, and in improving the aperture ratio.

With the above structure, it is possible to provide a touch panel capable of high-speed imaging. In addition, it is possible to provide a method for driving a touch panel capable of high-speed imaging.

Embodiment 4

In this embodiment, a structure of a liquid crystal display device as an example of a display device including a touch panel in one embodiment of the present invention is described with reference to FIG. 8.

Figure 8:
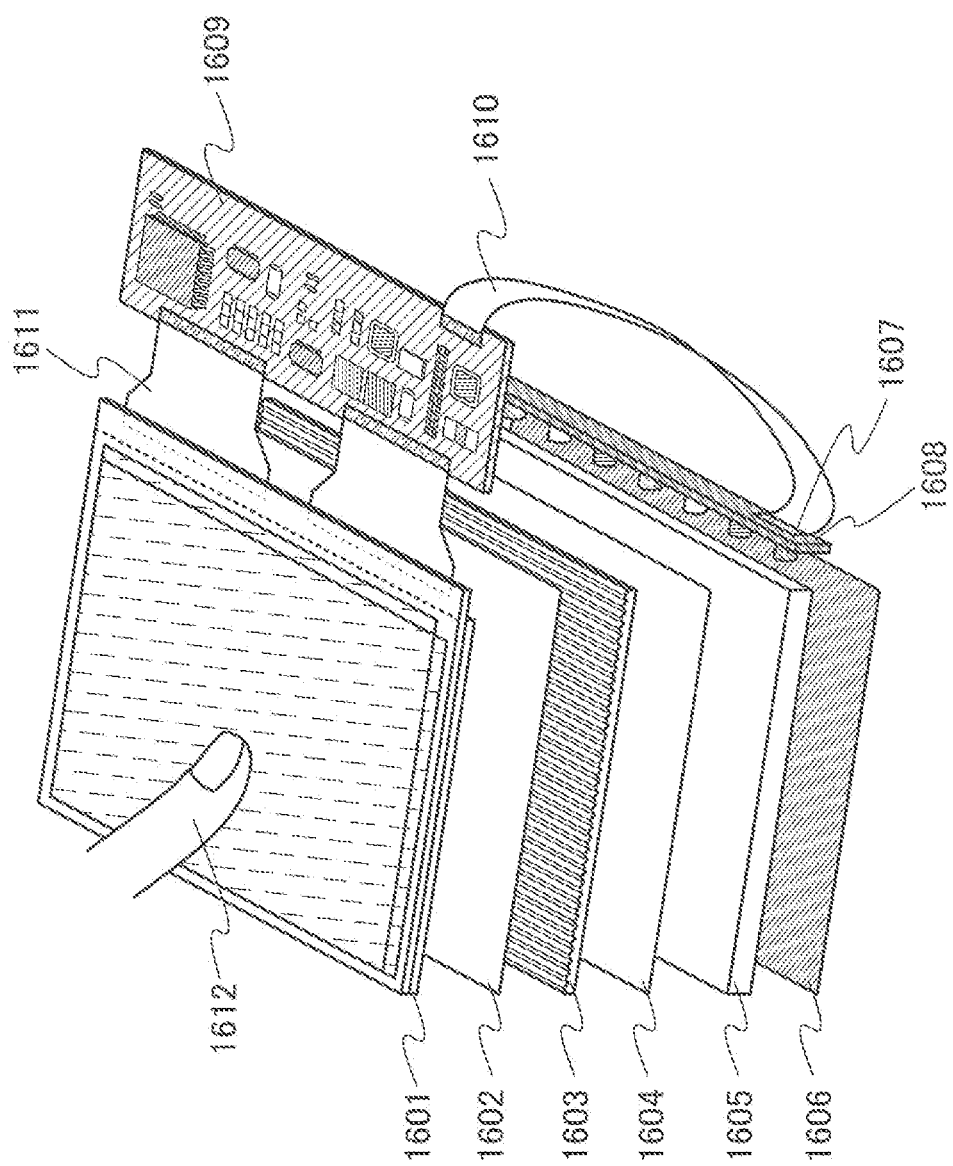
FIG. 8 illustrates a perspective view of an example of a structure of a liquid crystal display device including a touch panel.

FIG. 8 illustrates an example of a perspective view showing the structure of a liquid crystal display device including the touch panel in one embodiment of the present invention. The liquid crystal display device shown in FIG. 8 is provided with a liquid crystal panel 1601 including a pixel in which a liquid crystal element, a photodiode, a thin film transistor, and the like is formed between a pair of substrates; a first diffusing plate 1602; a prism sheet 1603; a second diffusing plate 1604; a light guide plate 1605; a reflection plate 1606; a backlight 1608 including a plurality of light sources 1607; and a circuit substrate 1609.

The liquid crystal panel 1601, the first diffusing plate 1602, the prism sheet 1603, the second diffusing plate 1604, the light guide plate 1605, and the reflection plate 1606 are stacked in this order. The light sources 1607 are provided in an end portion of the light guide plate 1605. Light from the light sources 1607 is diffused inside the light guide plate 1605, and passes through the second diffusing plate 1604, the prism sheet 1603, and the first diffusing plate 1602. Thus, the liquid crystal panel 1601 is uniformly irradiated with light from the counter substrate side (the side on which the light guide plate 1605 and the like are provided).

Although the first diffusing plate 1602 and the second diffusing plate 1604 are used in this embodiment, the number of diffusing plates is not limited thereto. The number of diffusing plates may be one, or may be three or more. It is acceptable as long as the diffusing plate is provided between the light guide plate 1605 and the liquid crystal panel 1601. Therefore, a diffusing plate may be provided only on the side closer to the liquid crystal panel 1601 than the prism sheet 1603, or may be provided only on the side closer to the light guide plate 1605 than the prism sheet 1603.

Further, the cross section of the prism sheet 1603 is not limited to a sawtooth shape shown in FIG. 8. The prism sheet 1603 may have a shape with which light from the light guide plate 1605 can be concentrated on the liquid crystal panel 1601 side.

The circuit substrate 1609 is provided with a circuit which generates various kinds of signals input to the liquid crystal panel 1601, a circuit which processes the signals, a circuit which processes various signals output from the liquid crystal panel 1601, or the like. In FIG. 8, the circuit substrate 1609 and the liquid crystal panel 1601 are connected to each other via a flexible printed circuit (FPC) 1611. Note that the circuit may be connected to the liquid crystal panel 1601 by using a chip On glass (COG) method, or part of the circuit may be connected to the FPC 1611 by using a chip On film (COF) method.

FIG. 8 shows an example in which the circuit substrate 1609 is provided with control circuits which control driving of the light sources 1607 where the control circuits and the light sources 1607 are connected via the FPC 1610. However, the above control circuits may be formed in the liquid crystal panel 1601; in this case, the liquid crystal panel 1601 and the light sources 1607 are connected via an FPC or the like.

Although FIG. 8 shows an example of an edge-light type light source in which the light sources 1607 are disposed in an end portion of the liquid crystal panel 1601, a touch panel in one embodiment of the present invention may be a direct type that includes the light sources 1607 disposed directly below the liquid crystal panel 1601.

For example, when a finger 1612, which is an object to be detected, becomes close to the liquid crystal panel 1601 from the TFT substrate side (the side over the liquid crystal panel 1601, which is opposite to the backlight 1608), light from the backlight 1608 passes through the liquid crystal panel 1601, and part of the light reflected by the finger 1612 and enters the liquid crystal panel 1601 again. Color image data of the finger 1612, which is the object to be detected, can be obtained by sequentially lighting the light sources 1607 that correspond to individual colors and obtaining image data of every color.

This embodiment can be implemented by being combined as appropriate with any of the above-described embodiments.

Embodiment 5

A touch panel in one embodiment of the present invention has a feature that high-speed imaging can be performed with an operation time of a photo sensor secured. In addition, a touch panel in one embodiment of the present invention has a feature that high-speed imaging can be performed with stable operation of a photo sensor. Therefore, an electronic device using the touch panel in one embodiment of the present invention can be equipped with higher-performance applications by employing the touch panel as its component.

The touch panel in one embodiment of the present invention can be included in display devices, laptop computers, and image reproducing devices provided with recording media (typically devices which reproduce the content of recording media such as DVDs (digital versatile disc) and have a display for displaying the reproduced images). Other than the above, as an electronic device which can use the touch panel in one embodiment of the present invention, mobile phones, portable game machines, portable information terminals, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given.

In this embodiment, examples of electronic devices each of which includes a touch panel in one embodiment of the present invention are described with reference to FIGS. 9A to 9E.

Figure 9A:
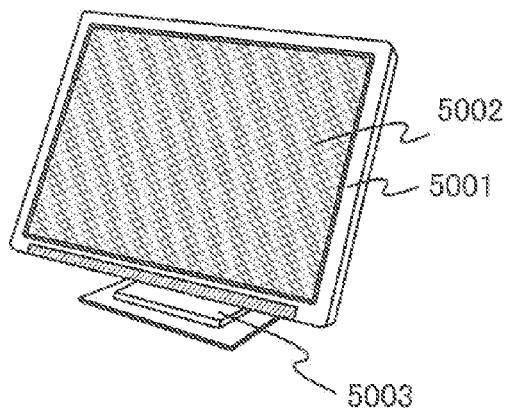
FIGS. 9A to 9E each illustrate an example of an electronic device to which a touch panel is applied.

FIG. 9A illustrates a display device including a housing 5001, a display portion 5002, a supporting base 5003, and the like. The touch panel in one embodiment of the present invention can be used for the display portion 5002. The use of a touch panel in one embodiment of the present invention for the display portion 5002 can provide a display device capable of obtaining an image data with high resolution and being equipped with higher-performance applications. Note that a display device includes all display devices for displaying information, such as display devices for personal computers, for receiving television broadcast, and for displaying advertisement, in its category.

Figure 9B:
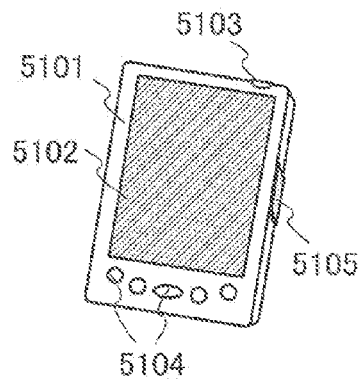

FIG. 9B illustrates a portable information terminal including a housing 5101, a display portion 5102, a switch 5103, an operation key 5104, an infrared rays port 5105, and the like. The touch panel in one embodiment of the present invention can be used for the display portion 5102. The use of a touch panel in one embodiment of the present invention for the display portion 5102 can provide a portable information terminal capable of obtaining an image data with high resolution and being equipped with higher-performance applications.

Figure 9C:
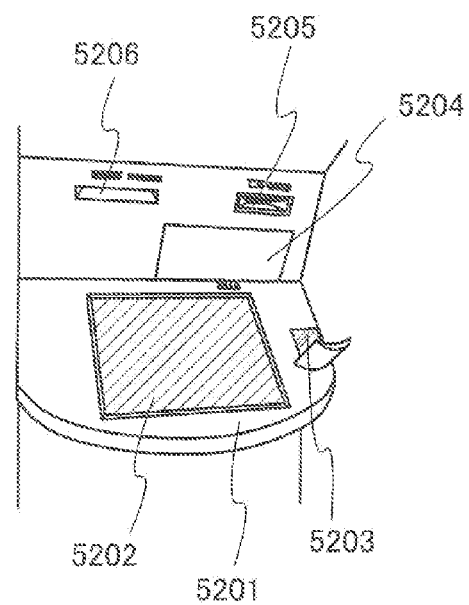

FIG. 9C illustrates an automated teller machine including a housing 5201, a display portion 5202, a coin slot 5203, a bill slot 5204, a card slot 5205, a bankbook slot 5206, and the like. The touch panel in one embodiment of the present invention can be used for the display portion 5202. The use of a touch panel in one embodiment of the present invention for the display portion 5202 can provide an automated teller machine capable of obtaining an image data with high resolution and being equipped with higher-performance applications. The automated teller machine using the touch panel in one embodiment of the present invention can read information of living body such as a fingerprint, a face, a handprint, a palm print, a pattern of a hand vein, an iris, and the like which are used for biometrics with higher accuracy. Therefore, a false non-match rate which is false recognition of a person to be identified as a different person and a false acceptance rate which is false recognition of a different person as a person to be identified can be suppressed.

Figure 9D:
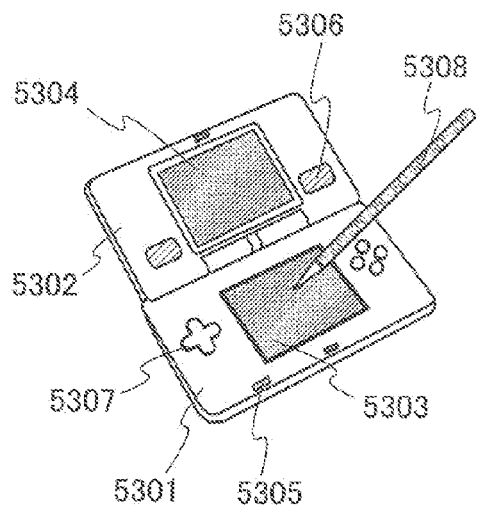

FIG. 9D illustrates a portable game machine including a housing 5301, a housing 5302, a display portion 5303, a display portion 5304, a microphone 5305, speakers 5306, an operation key 5307, a stylus 5308, and the like. The touch panel in one embodiment of the present invention can be used for the display portion 5303 or the display portion 5304. The use of a touch panel in one embodiment of the present invention for the display portion 5303 or the display portion 5304 can provide a portable game machine capable of obtaining an image data with high resolution and being equipped with higher-performance applications. Note that although the portable game machine illustrated in FIG. 9D includes two display portions 5303 and 5304, the number of display portions included in the portable game machine is not limited thereto.

Figure 9E:
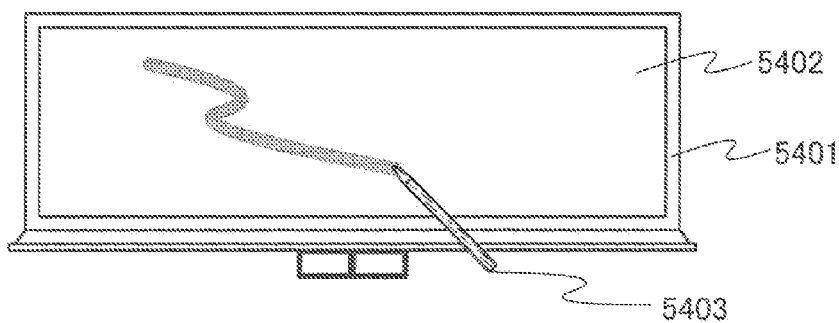

FIG. 9E illustrates an electronic blackboard that includes a housing 5401, a drawing portion 5402, and the like. Information such as texts or drawings can be written on the drawing portion 5402 of the electronic blackboard with the stylus 5403, a marker using oil-based ink, or the like. Further, the electronic blackboard can make information written on the drawing portion 5402 to be electronic data by using a photo sensor. In the case of using the stylus 5403, the information written on the drawing portion 5402 is made electronic data by the photo sensor and then displayed on the drawing portion 5402 by a display element. The touch panel in one embodiment of the present invention can be used for the drawing portion 5402. The use of the touch panel in one embodiment of the present invention for the drawing portion 5402 can provide an electronic blackboard capable of obtaining an image data with high resolution and being equipped with higher-performance applications.

This embodiment can be implemented by being combined as appropriate with any of the above-described embodiments.

This application is based on Japanese Patent Application serial no. 2009-193216 filed with Japan Patent Office on Aug. 24, 2009, the entire contents of which are hereby incorporated by reference.

What is claimed is:

1. A method for driving a touch panel including at least a first pixel and a second pixel, each including a photo sensor having a photodiode, a first transistor, and a second transistor, comprising:
    setting a potential of a first photodiode reset signal line which is electrically connected to the photodiode in the first pixel so that a forward bias is applied to the photodiode in the first pixel; and
    changing a potential of a gate of the second transistor in the second pixel so that a photo sensor output signal line and a photo sensor reference signal line are brought into conduction through the first transistor in the second pixel and the second transistor in the second pixel, thereby a potential of the photo sensor output signal line is changed in accordance with a photocurrent of the photodiode in the second pixel which is electrically connected to a gate of the first transistor in the second pixel,
    wherein a period for the step of setting and a period for the step of changing are not overlapped with each other,
    wherein one of a source and a drain of the first transistor in the second pixel is electrically connected to one of the photo sensor output signal line and the photo sensor reference signal line,
    wherein one of a source and a drain of the second transistor in the second pixel is electrically connected to the other of the photo sensor output signal line and the photo sensor reference signal line, and
    wherein the other of the source and the drain of the first transistor in the second pixel is electrically connected to the other of the source and the drain of the second transistor in the second pixel.

2. The method for driving the touch panel according to claim 1,
    wherein the photo sensor output signal line is electrically connected to the one of a source and a drain of the second transistor in the second pixel, and
    wherein the photo sensor reference signal line is electrically connected to the one of a source and a drain of the first transistor in the second pixel.

3. The method for driving the touch panel according to claim 1,
    wherein the photo sensor output signal line is electrically connected to the one of the source and the drain of the first transistor in the second pixel, and
    wherein the photo sensor reference signal line is electrically connected to the one of the source and the drain of the second transistor in the second pixel.

4. The method for driving the touch panel according to claim 1,
    wherein a potential of the gate of the first transistor in the second pixel is changed by the photocurrent of the photodiode in the second pixel.

5. The method for driving a touch panel according to claim 1, wherein the touch panel further includes a third pixel including a photo sensor having a photodiode, a first transistor, and a second transistor, the method further comprising:
    after the step of changing, setting a potential of a second photodiode reset signal line which is electrically connected to the photodiode in the third pixel so that a forward bias is applied to the photodiode in the third pixel, the third pixel being a pixel adjacent to the first pixel in row direction.

6. A method for driving a touch panel including at least a first pixel, a second pixel, and a third pixel, each including a photo sensor having a photodiode, a first transistor, and a second transistor, comprising:
    changing a potential of a gate of the second transistor in the first pixel so that a photo sensor output signal line and a photo sensor reference signal line are brought into conduction through the first transistor in the first pixel and the second transistor in the first pixel, thereby a potential of the photo sensor output signal line is changed in accordance with a photocurrent of the photodiode in the first pixel which is electrically connected to a gate of the first transistor in the first pixel;
    after the step of changing the potential of the gate of the second transistor in the first pixel, setting a potential of a photodiode reset signal line which is electrically connected to the photodiode in the second pixel so that a forward bias is applied to the photodiode in the second pixel; and
    after the step of setting, changing a potential of a gate of the second transistor in the third pixel so that the photo sensor output signal line and the photo sensor reference signal line are brought into conduction through the first transistor in the third pixel and the second transistor in the third pixel, thereby the potential of the photo sensor output signal line is changed in accordance with a photocurrent of the photodiode in the third pixel which is electrically connected to a gate of the first transistor in the third pixel, the third pixel being a pixel adjacent to the first pixel in row direction,
    wherein a period for the step of setting and a period for the step of changing the potential of the gate of the second transistor in the first pixel are not overlapped with each other,
    wherein one of a source and a drain of the first transistor in the first pixel is electrically connected to one of the photo sensor output signal line and the photo sensor reference signal line,
    wherein one of a source and a drain of the second transistor in the first pixel is electrically connected to the other of the photo sensor output signal line and the photo sensor reference signal line, and wherein the other of the source and the drain of the first transistor in the first pixel is electrically connected to the other of the source and the drain of the second transistor in the first pixel.

7. The method for driving the touch panel according to claim 6,
wherein the photo sensor output signal line is electrically connected to the one of the source and the drain of the second transistor in the first pixel, and
wherein the photo sensor reference signal line is electrically connected to the one of the source and the drain of the first transistor in the first pixel.

8. The method for driving the touch panel according to claim 6,
wherein the photo sensor output signal line is electrically connected to the one of the source and the drain of the first transistor in the first pixel, and
wherein the photo sensor reference signal line is electrically connected to the one of the source and the drain of the second transistor in the first pixel.

9. The method for driving the touch panel according to claim 6,
wherein a potential of the gate of the first transistor in the first pixel is changed by the photocurrent of the photodiode in the first pixel.

10. A method for driving a touch panel including at least a first pixel and a second pixel, each including a photo sensor having a photodiode, a first transistor, and a second transistor, comprising:
setting a potential of a photodiode reset signal line which is electrically connected to the photodiode in the first pixel so that a forward bias is applied to the photodiode in the first pixel; and
simultaneously with the step of setting, changing a potential of a gate of the second transistor in the second pixel so that a photo sensor output signal line and a photo sensor reference signal line are brought into conduction through the first transistor in the second pixel and the second transistor in the second pixel, thereby a potential of the photo sensor output signal line is changed in accordance with a photocurrent of the photodiode in the second pixel which is electrically connected to a gate of the first transistor in the second pixel,
wherein one of a source and a drain of the first transistor in the second pixel is electrically connected to one of the photo sensor output signal line and the photo sensor reference signal line,
wherein one of a source and a drain of the second transistor in the second pixel is electrically connected to the other of the photo sensor output signal line and the photo sensor reference signal line, and
wherein the other of the source and the drain of the first transistor in the second pixel is electrically connected to the other of the source and the drain of the second transistor in the second pixel.

11. The method for driving the touch panel according to claim 10,
wherein the photo sensor output signal line is electrically connected to the one of the source and the drain of the second transistor in the second pixel, and
wherein the photo sensor reference signal line is electrically connected to the one of the source and the drain of the first transistor in the second pixel.

12. The method for driving the touch panel according to claim 10,
wherein the photo sensor output signal line is electrically connected to the one of the source and the drain of the first transistor in the second pixel, and
wherein the photo sensor reference signal line is electrically connected to the one of the source and the drain of the second transistor in the second pixel.

13. The method for driving the touch panel according to claim 10,
wherein a potential of the gate of the first transistor in the second pixel is changed by the photocurrent of the photodiode in the second pixel.

14. A method for driving a touch panel including a photo sensor having a photodiode, a first transistor, and a second transistor, the method comprising:
setting a potential of a first photodiode reset signal line which is electrically connected to the photodiode so that a forward bias is applied to the photodiode; and
changing a potential of a gate of the second transistor so that a photo sensor output signal line and a photo sensor reference signal line are brought into conduction through the first transistor and the second transistor, thereby a potential of the photo sensor output signal line is changed in accordance with a photocurrent of the photodiode which is electrically connected to a gate of the first transistor,
wherein a period for the step of setting and a period for the step of changing are not overlapped with each other,
wherein one of a source and a drain of the first transistor is electrically connected to one of the photo sensor output signal line and the photo sensor reference signal line,
wherein one of a source and a drain of the second transistor is electrically connected to the other of the photo sensor output signal line and the photo sensor reference signal line, and
wherein the other of the source and the drain of the first transistor is electrically connected to the other of the source and the drain of the second transistor.

15. The method for driving the touch panel according to claim 14,
wherein the photo sensor output signal line is electrically connected to the one of a source and a drain of the second transistor, and
wherein the photo sensor reference signal line is electrically connected to the one of a source and a drain of the first transistor.

16. The method for driving the touch panel according to claim 14,
wherein the photo sensor output signal line is electrically connected to the one of a source and a drain of the first transistor, and
wherein the photo sensor reference signal line is electrically connected to the one of a source and a drain of the second transistor.

17. The method for driving the touch panel according to claim 14,
wherein a potential of the gate of the first transistor is changed by the photocurrent of the photodiode.

* * * * *